United States Patent
Staas et al.

(10) Patent No.: US 10,189,154 B2
(45) Date of Patent: Jan. 29, 2019

(54) POWER TOOL

(71) Applicant: Black & Decker Inc., Newark, DE (US)

(72) Inventors: Ernst Staas, Limburg (DE); Stefan Gensmann, Frucht (DE); Achim Buchholz, Limburg (DE)

(73) Assignee: Black & Decker Inc., New Britain, CT (US)

( * ) Notice: Subject to any disclaimer, the term of this patent is extended or adjusted under 35 U.S.C. 154(b) by 798 days.

(21) Appl. No.: 14/318,073

(22) Filed: Jun. 27, 2014

(65) Prior Publication Data
US 2015/0014011 A1    Jan. 15, 2015

(30) Foreign Application Priority Data
Jul. 5, 2013   (EP) .................................. 13175378

(51) Int. Cl.
| | |
|---|---|
| *B25D 17/00* | (2006.01) |
| *B25F 5/02* | (2006.01) |
| *B25D 16/00* | (2006.01) |
| *F16J 15/50* | (2006.01) |

(52) U.S. Cl.
CPC ................ *B25F 5/02* (2013.01); *B25D 16/00* (2013.01); *B25D 17/00* (2013.01); *F16J 15/50* (2013.01); *B25D 2222/24* (2013.01); *B25D 2222/61* (2013.01); *B25D 2250/065* (2013.01); *B25D 2250/121* (2013.01); *B25D 2250/245* (2013.01);
(Continued)

(58) Field of Classification Search
CPC ..... B25F 5/02; B25D 17/00; B25D 2250/121; F16J 15/50

USPC .......................................................... 173/210
See application file for complete search history.

(56) References Cited

U.S. PATENT DOCUMENTS

| | | | |
|---|---|---|---|
| 1,346,565 | A | 5/1918 | Sherbondy |
| 2,821,323 | A | 12/1955 | Lee |
| 2,931,926 | A | 4/1960 | De Angelis et al. |

(Continued)

FOREIGN PATENT DOCUMENTS

| | | |
|---|---|---|
| DE | 4343563 | 6/1995 |
| DE | 102008000737 A1 | 9/2009 |

(Continued)

OTHER PUBLICATIONS

Arnaud Rilliard, European Search Report, dated Nov. 13, 2013, The Hague, Netherlands.
(Continued)

*Primary Examiner* — Andrew M Tecco
*Assistant Examiner* — Chelsea Stinson
(74) *Attorney, Agent, or Firm* — Amir Rohani

(57) ABSTRACT

A power tool comprises a housing having at least two housing parts and at least one recess, a portion of the recess provided by each housing part, and a bearing located in the recess. The power tool includes a seal comprising an elongate seal member located between the housing parts to seal at least a portion of the housing. The seal includes at least one polymeric extension part extending from the elongate seal member and in contact with an external part of the bearing without extending around the bearing. The polymeric extension part of the seal prevents the external part of the bearing from rotating with respect to the housing during use of the power tool.

16 Claims, 2 Drawing Sheets

(52) U.S. Cl.
CPC .. *B25D 2250/331* (2013.01); *B25D 2250/335* (2013.01); *B25D 2250/365* (2013.01)

(56) References Cited

U.S. PATENT DOCUMENTS

| | | | |
|---|---|---|---|
| 2,965,774 | A | 12/1960 | Rangus |
| 2,984,757 | A | 5/1961 | Papworth |
| 3,259,770 | A | 7/1966 | Matson et al. |
| 3,411,024 | A | 11/1968 | Maffey |
| 3,451,583 | A | 6/1969 | Lee |
| 4,620,641 | A | 11/1986 | Beer |
| 4,815,629 | A | 3/1989 | Tausk |
| 5,779,085 | A | 7/1998 | Havlinek et al. |
| 7,705,497 | B2 * | 4/2010 | Arich .................... B25D 16/00 173/117 |
| 8,695,724 | B2 * | 4/2014 | Nakashima ............ B23D 51/01 173/162.2 |
| 2011/0100665 | A1 * | 5/2011 | Nakashima ............ B23D 51/01 173/162.2 |
| 2012/0073847 | A1 * | 3/2012 | Nagasaka ................. B25F 5/02 173/217 |
| 2013/0196203 | A1 * | 8/2013 | Wackwitz ................ B25F 5/00 429/96 |

FOREIGN PATENT DOCUMENTS

| | | |
|---|---|---|
| DE | 202010006343 U1 | 8/2010 |
| EP | 0489277 | 6/1992 |
| EP | 0489277 A1 | 6/1992 |
| WO | 2008074554 A1 | 6/2008 |

OTHER PUBLICATIONS

Annex to the European Search Report on European Patent Application No. EP 13 17 5378.

* cited by examiner

POWER TOOL

CROSS-REFERENCE TO RELATED APPLICATIONS

This application claims priority, under 35 U.S.C. § 119, to European Patent Application No. 13175378.2, filed Jul. 5, 2013, and incorporated herein by reference in its entirety.

FIELD OF THE INVENTION

The present invention relates to power tools, preferably portable power tools, and especially hammer drills.

BACKGROUND OF THE INVENTION

European Patent Application EP 0489277 A1 discloses a gasket seal for a front portion of a housing (housing the gearbox) of a hammer drill. The housing is longitudinally divided into two parts, with the gasket seal located between the housing parts to seal the housing. An aperture is provided in the housing, a portion of which aperture is provided by each housing part. A rotary shaft extends through the aperture, supported by a bearing located in the aperture. The gasket seal includes an annular portion which extends around an external surface of the bearing to seal between the bearing and the housing.

BRIEF SUMMARY OF THE INVENTION

In a first aspect, the present invention provides a power tool, comprising: a housing having at least two housing parts and at least one recess, a portion of the recess provided by each housing part; a bearing located in the recess; and a seal comprising an elongate seal member located between the housing parts to seal at least a portion of the housing; wherein the seal includes at least one polymeric extension part extending from the elongate seal member and in contact with an external part of the bearing without extending around the bearing, thereby to prevent the external part of the bearing from rotating with respect to the housing during use of the power tool.

The housing parts preferably divide the housing into two substantially equal parts, preferably longitudinally, e.g. on a plane in which the axis of a rotary shaft of the power tool is situated. In some embodiments of the invention, the recess may comprise an aperture in the housing, e.g. an aperture extending between an interior and an exterior of the housing, or between two interior regions of the housing.

The polymeric extension part of the seal preferably is at least partly located in an orifice of the housing, a portion of the orifice provided by each housing part.

The polymeric extension part of the seal preferably comprises an elastomeric material. The elastomeric material preferably comprises a silicone elastomer, especially a polysiloxane.

The external part of the bearing preferably comprises an outer race of the bearing. The bearing preferably comprises inner and outer races, with bearing members, e.g. bearing balls or rollers, located between the inner and outer races.

The housing preferably includes at least one opening, a portion of the opening provided by each housing part. In preferred embodiments of the invention, a plug member may be located in the opening to close the opening. The elongate seal member preferably extends around the plug member to seal between the plug member and the housing.

A second aspect of the invention provides a power tool, comprising: a housing having at least two housing parts and at least one opening, a portion of the opening provided by each housing part; a seal comprising an elongate seal member located between the housing parts to seal at least a portion of the housing; and a plug member located in the opening to close the opening; wherein the elongate seal member extends around the plug member to seal between the plug member and the housing.

It is to be understood that any feature, including any preferred feature, of an aspect of the invention may be a feature, including a preferred feature, of another aspect of the invention.

The plug member preferably comprises a polymer member, for example formed from a polyamide.

The plug member preferably includes a groove located in an external peripheral surface thereof, in which the elongate seal member is located.

The housing opening of either aspect of the invention preferably extends between an interior and an exterior of the housing.

The elongate seal member of either aspect of the invention preferably is located in a channel of the housing, a portion of the channel preferably provided by each housing part.

The housing of either aspect of the invention preferably comprises an inner housing which is located at least partially inside an outer housing of the power tool.

The housing, which preferably is an inner housing, preferably comprises metal, e.g. a magnesium alloy or an aluminium alloy, or a magnesium-aluminium alloy.

BRIEF DESCRIPTION OF THE DRAWINGS

Preferred embodiments of the invention will now be described, by way of example, with reference to the accompanying drawings, of which.

DETAILED DESCRIPTION OF THE INVENTION

Figure 1:
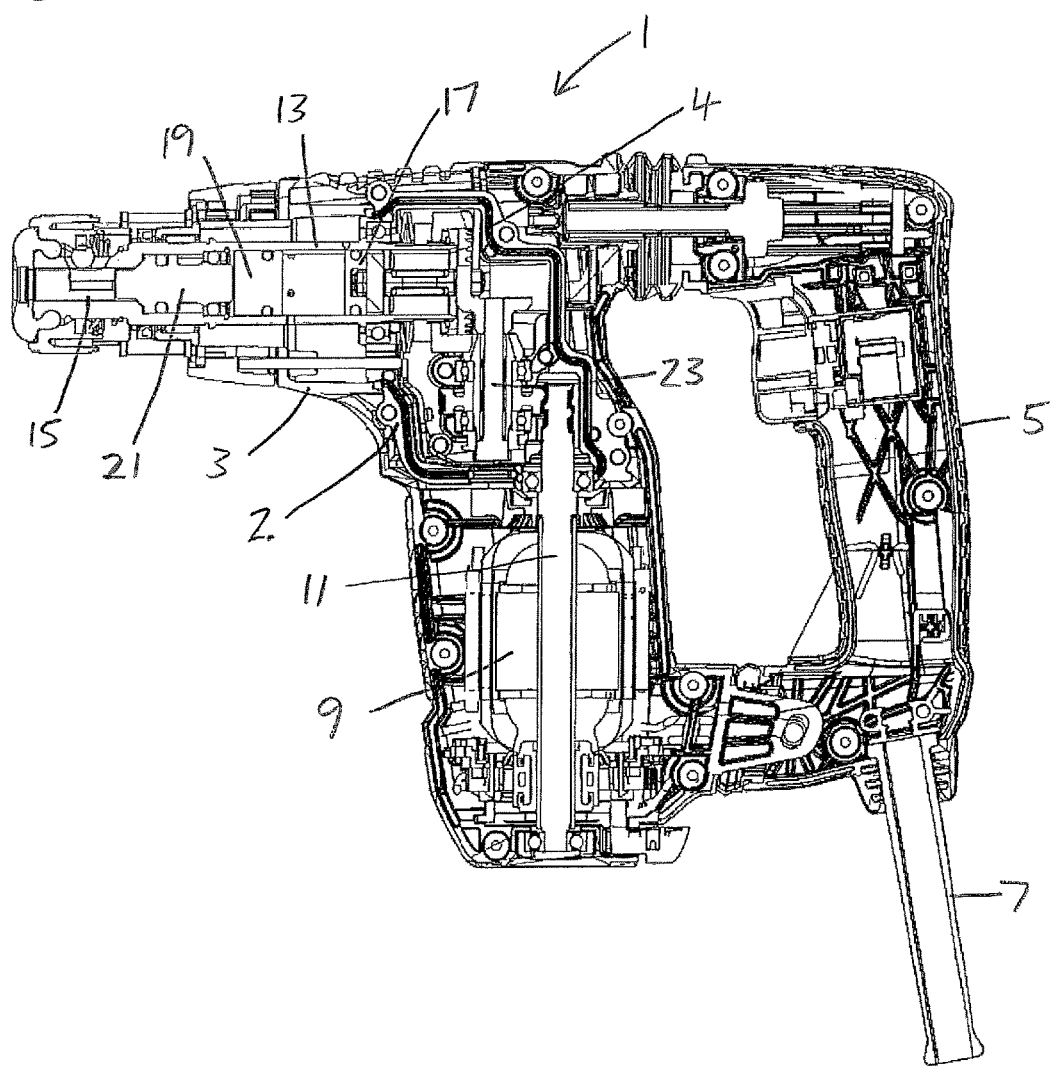
FIG. 1 shows, in cross-section, an embodiment of a hammer drill according to the invention.

FIG. 1 shows an embodiment of a portable hammer drill 1 according to the invention, comprising a main outer housing 3, preferably formed from an electrically insulating plastics material. The outer housing 3 includes a handle 5 with an electrical power cord protector 7 extending therefrom. Located in the outer housing 3 are an electric motor 9 which includes a motor output shaft 11, and part of a hollow spindle 13 which includes a conventional tool holder 15 for holding tools such as drill bits or chisels (not shown). The hammer drill 1 includes a pneumatic hammer mechanism which comprises a piston 17 located in the hollow spindle 13 and arranged for reciprocating motion. Also located in the hollow spindle 13 and arranged for reciprocating motion are a ram 19 and a beat piece 21. The hammer drill 1 also includes an intermediate shaft assembly 23 which interconnects the tool spindle and hammer mechanism with the motor output shaft 11.

Figure 2:
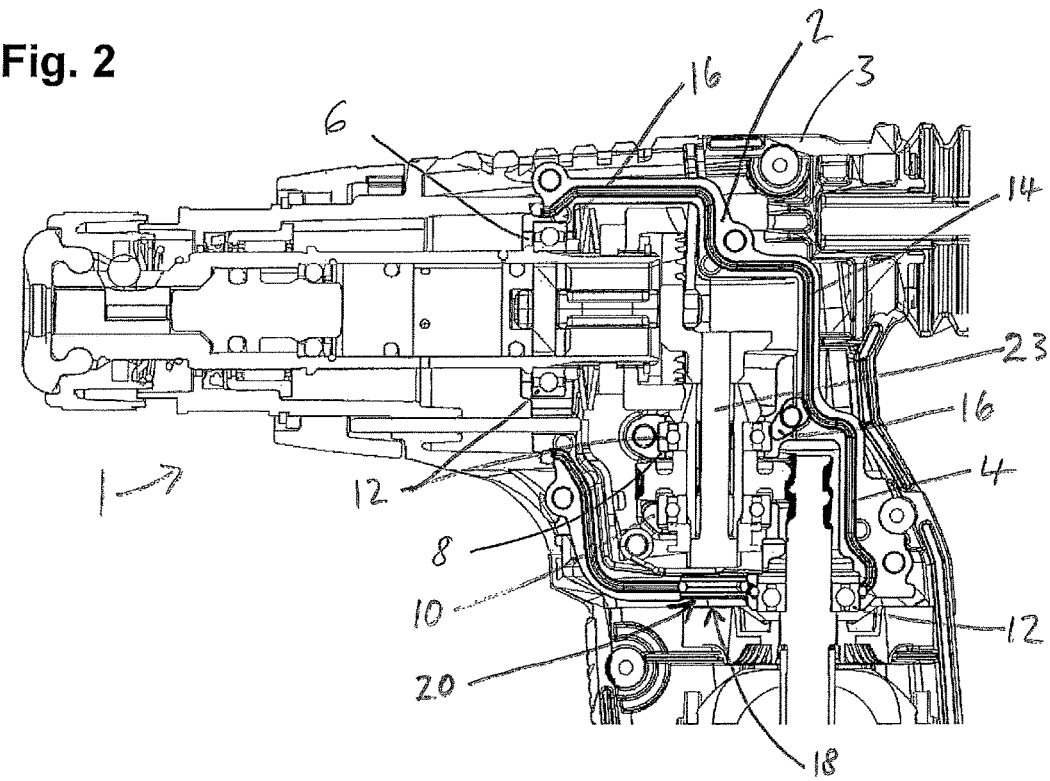
FIG. 2 shows a detail of the hammer drill of FIG. 1.
Figure 3:
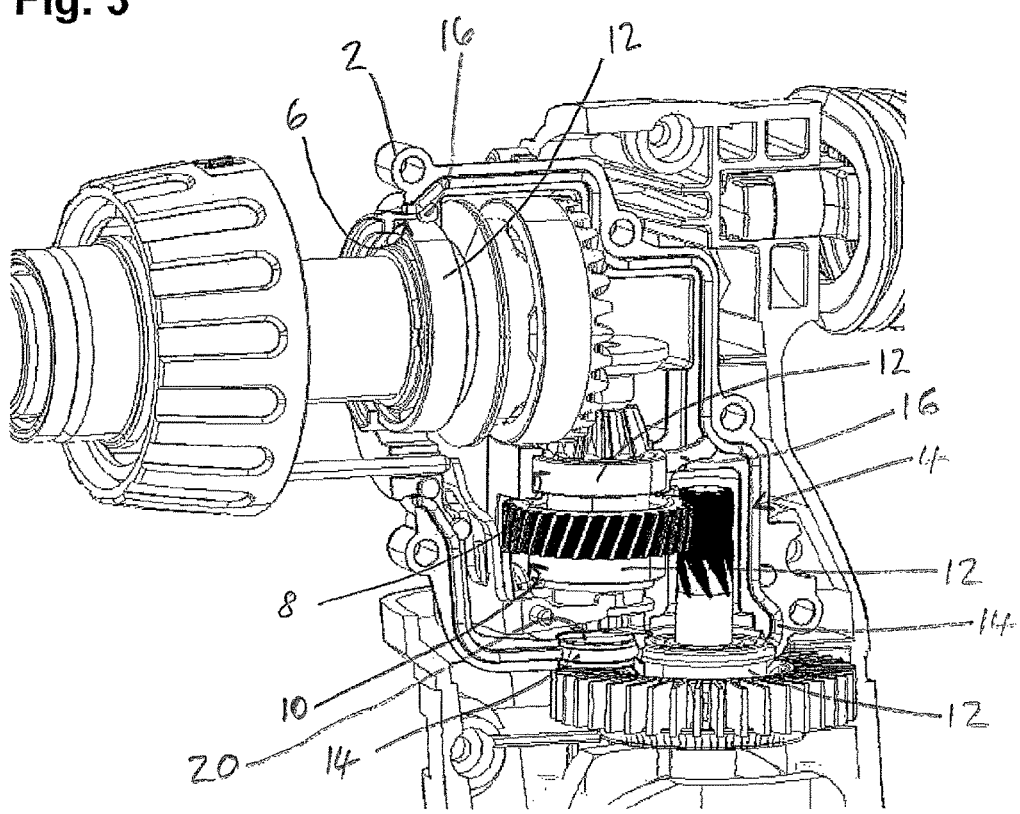
FIG. 3 shows another detail view of the hammer drill of FIGS. 1 and 2.

The intermediate shaft assembly 23, part of the motor output shaft 11, part of the hollow spindle, and part of the hammer mechanism, are located within an inner housing 2 which is located inside the main outer housing 3 of the hammer drill 1. Both the outer housing 3 and the inner housing 2 are divided longitudinally into two substantially equal parts, only one of which is shown for each housing. The inner housing 2 preferably is formed from metal (e.g. a low density magnesium-aluminium alloy), and seal 4 is located between the two housing parts of the inner housing. FIGS. 2 and 3 show the inner housing and seal, etc., in greater detail.

The inner housing 2 includes three recesses 6, 8 and 10, each of which has a respective bearing 12 located therein. Recesses 8 and 10 in the inner housing 2 are internal to the inner housing. However, recess 6 comprises an aperture extending between the interior and the exterior of the inner housing. For each of the three recesses 6, 8 and 10, half of the recess is provided by each housing part. The seal 4 comprises an elongate seal member 14 located between the housing parts substantially to seal the inner housing 2. The elongate seal member 14 is located in a channel of the inner housing 2, a portion of the channel provided by each housing part of the inner housing. The seal 4 includes two polymeric extension parts 16, each of which extends from the elongate seal member 14 and is in contact with an external part of a respective bearing 12 without extending around the bearing. Each polymeric extension part 16 of the seal 4 is at least partly located in an orifice of the inner housing, a portion of the orifice provided by each housing part of the inner housing. Each polymeric extension part 16 of the seal 4 is formed from a resilient material, preferably an elastomer, and preferably is at least slightly compressed against the external part of the bearing 12. The external part of each bearing 12 is an outer race of the bearing, and each of the two polymeric extension parts 16 is arranged to prevent the external part of a bearing from rotating with respect to the housing during use of the power tool, as the shaft supported by the internal part (i.e. the internal race) of the bearing rotates.

The inner housing 2 also includes an opening 18 extending between the interior and the exterior of the inner housing, which opening is provided merely to enable the recesses 8 and 10 (which support the bearings which support the intermediate shaft assembly 23) to be provided by machining the metal of the inner housing 2. A plug member 20 is located in the opening 18 to close the opening, and the elongate seal member 14 extends around the plug member to seal between the plug member and the inner housing 2. The plug member 20 is formed from a polymer, in particular a polyamide. The plug member 20 includes a groove located in its external peripheral surface, in which the elongate seal member 14 is located.

It will be understood that the above description and the drawings are of particular examples of the invention, but that other examples of the invention are included in the scope of the claims.

The invention claimed is:

1. A Power tool, comprising:
a housing having at least two housing parts, each housing part having an inner portion defining a recess therein;
a bearing located in the housing, the bearing having an outer race, wherein the respective recesses of the two housing parts mate around the outer race of the bearing and come in direct contact with the outer race of the bearing to support the bearing inside the housing; and
a seal comprising an elongate seal member located between the housing parts to seal at least a portion of the housing;
wherein the seal includes at least one polymeric extension part extending from the elongate seal member between the two housing parts and in direct contact with the outer race of the bearing without extending around the bearing, so as to prevent the outer race of the bearing from rotating with respect to the housing during use of the power tool.

2. The power tool according to claim 1, wherein the polymeric extension part of the seal is at least partly located in an orifice of the housing, wherein a portion of the orifice is provided by each housing part.

3. The power tool according to claim 1, wherein the polymeric extension part of the seal comprises an elastomeric material.

4. The power tool according to claim 3, wherein the elastomeric material comprises a silicone elastomer.

5. The power tool according to claim 1, wherein the housing includes at least one opening, wherein a portion of the opening is provided by each housing part.

6. The power tool according to claim 5, further comprising a plug member located in the opening to close the opening.

7. The power tool according to claim 6, wherein the elongate seal member extends around the plug member to seal between the plug member and the housing.

8. The power tool according to claim 1, wherein the power tool is a hammer drill.

9. A power tool, comprising:
a main outer housing;
an inner housing having at least two housing parts disposed within the main outer housing, each housing part having an inner portion defining a recess therein;
an opening formed between the at least two housing parts of the inner housing the opening providing access to an inner portion of the inner housing to facilitate machining of the respective recesses within the two housing parts, wherein a portion of the opening is provided by each housing part;
a bearing located in the housing, the bearing having an outer race, wherein the respective recesses of the two housing parts mate around the outer race of the bearing and come in direct contact with the outer race of the bearing to support the bearing inside the housing
a seal comprising an elongate seal member located between the housing parts to substantially seal at least a portion of the inner housing; and
a substantially planar-shaped plug member located in the opening to close the opening of the inner housing to an inner portion of the main outside housing, the plug member having a first face facing the inner portion of the inner housing and a second face facing the inner portion of the main outside housing;
wherein the elongate seal member extends between the at least two housing parts around the plug member to seal between the plug member and the inner housing.

10. The power tool according to claim 9, wherein the plug member is formed from a polyamide.

11. The power tool according to claim 9, wherein the plug member includes a groove located in an external peripheral surface thereof, in which the elongate seal member is located.

12. The power tool according to claim 9, wherein the elongate seal member is located in a channel of the inner housing, a portion of the channel provided by each housing part.

13. The power tool according to claim 9, wherein the opening extends between an interior and an exterior of the inner housing.

14. The power tool according to claim 9, wherein the inner housing comprises a metal or a metal alloy.

15. The power tool according to claim 14, wherein the inner housing comprises one or more of magnesium and aluminium.

16. The power tool according to claim 9, wherein the power tool is a hammer drill.

\* \* \* \* \*